Sept. 25, 1956     D. R. CONKLING     2,764,662

ELECTRIC HEATING APPARATUS

Filed Aug. 17, 1954     3 Sheets-Sheet 1

INVENTOR.
Donald R. Conkling
BY
Smith, Olsen, Baird & Gulbrandsen
Attys.

Sept. 25, 1956     D. R. CONKLING     2,764,662
ELECTRIC HEATING APPARATUS
Filed Aug. 17, 1954     3 Sheets-Sheet 3

INVENTOR.
Donald R. Conkling
BY
Smith, Olsen, Baird & Gulbrandsen
Attys.

United States Patent Office 2,764,662
Patented Sept. 25, 1956

2,764,662

ELECTRIC HEATING APPARATUS

Donald R. Conkling, Wheaton, Ill., assignor to General Electric Company, a corporation of New York Application August 17, 1954, Serial No. 450,361

6 Claims. (Cl. 219—20)

The present invention relates to electric heating apparatus, and more particularly to improved switching and automatic temperature control systems for electric heating units or hotplates.

It is the general object of the present invention to provide in electric heating apparatus including an electric hotplate, a source of electric power and equipment for automatically controlling the temperature of the hotplate, a unitary manually operable control switch having an automatic temperature control position and a plurality of heat-setting positions, wherein the control switch is operable into its automatic temperature control position to establish a heating connection via the automatic temperature control equipment between the power source and the hotplate so that the temperature of the hotplate is selectively governed by the automatic temperature control equipment, and wherein the control switch is selectively operable into its different heat-setting positions to establish a corresponding plurality of different direct electrical heating connections independent of the automatic temperature control equipment between the hotplate and the power source so as to effect heating of the hotplate at corresponding different heating rates.

Another object of the invention is to provide heating apparatus of the character described, wherein the unitary manually operable control switch is of the pushbutton type provided with a number of individual pushbuttons respectively corresponding to its positions named, and wherein the pushbuttons are interlocked so that operation of any one of the pushbuttons out of its normal position effects the return into its normal position of the prior last-operated one of the pushbuttons.

A further object of the invention is to provide heating apparatus of the character described, wherein the automatic temperature control equipment includes a manually operable member operatively associated with the control switch and selectively operative to set the desired temperature control range of the automatic temperature control equipment and consequently the desired cooking temperature of the hotplate.

A still further object of the invention is to provide heating apparatus of the character described, wherein the manually operable member mentioned is in the form of a knob mounted for selectively linear movements to impart the selective settings to the automatic temperature control equipment.

Further features of the invention pertain to the particular arrangement of the elements of the electric heating apparatus and of the associated control network, whereby the above-outlined and additional operating features thereof are attained.

The invention, both as to its organization and method of operation, together with further objects and advantages thereof, will best be understood by reference to the following specification taken in connection with the accompanying drawings, in which.

Figure 1:
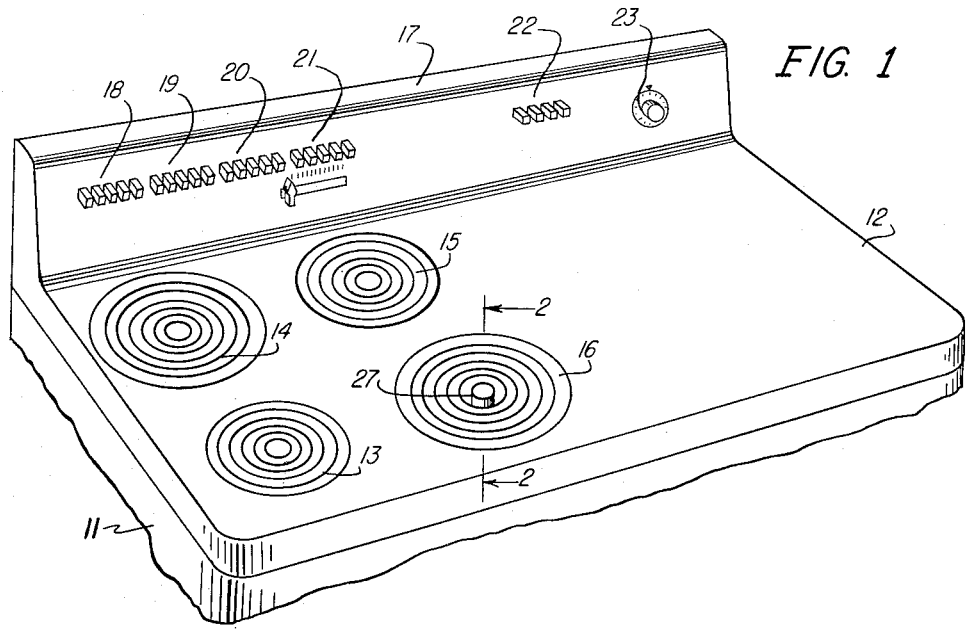
Figure 1 is a fragmentary front perspective view of the upper portion of an electric range incorporating electric heating apparatus embodying the present invention.
Figure 2:
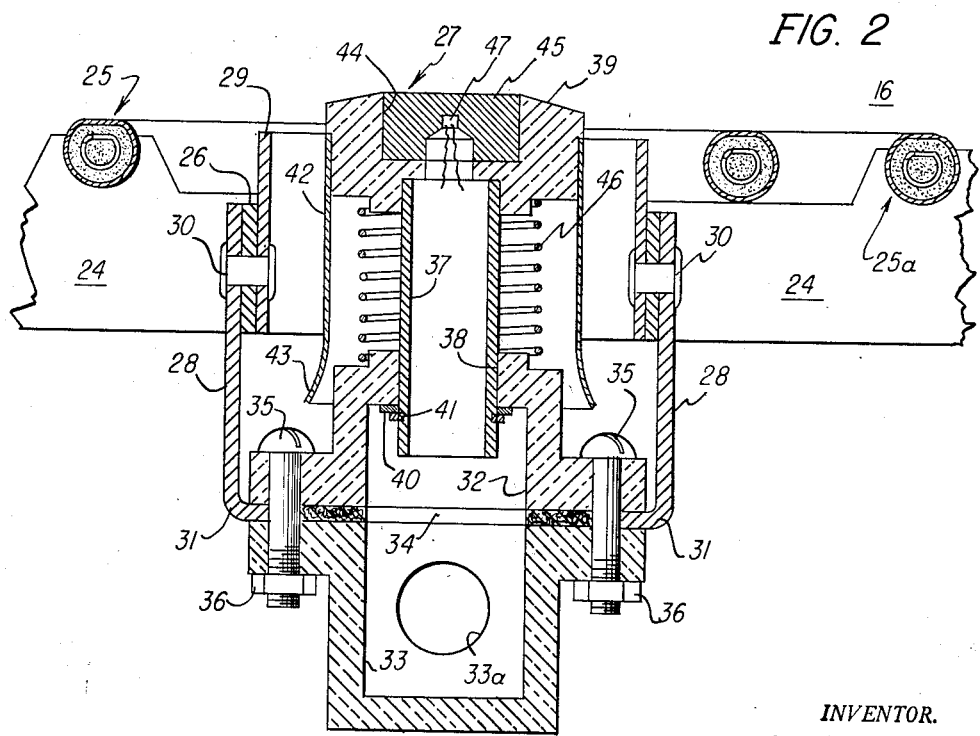
Fig. 2 is a greatly enlarged fragmentary vertical sectional view of one of the electric heating units or hotplates incorporated in the electric range, taken in the direction of the arrows along the line 2—2 in Fig. 1, illustrating the construction of the temperature sensing unit incorporated therein and forming a part of the electric control network.
Figure 3:
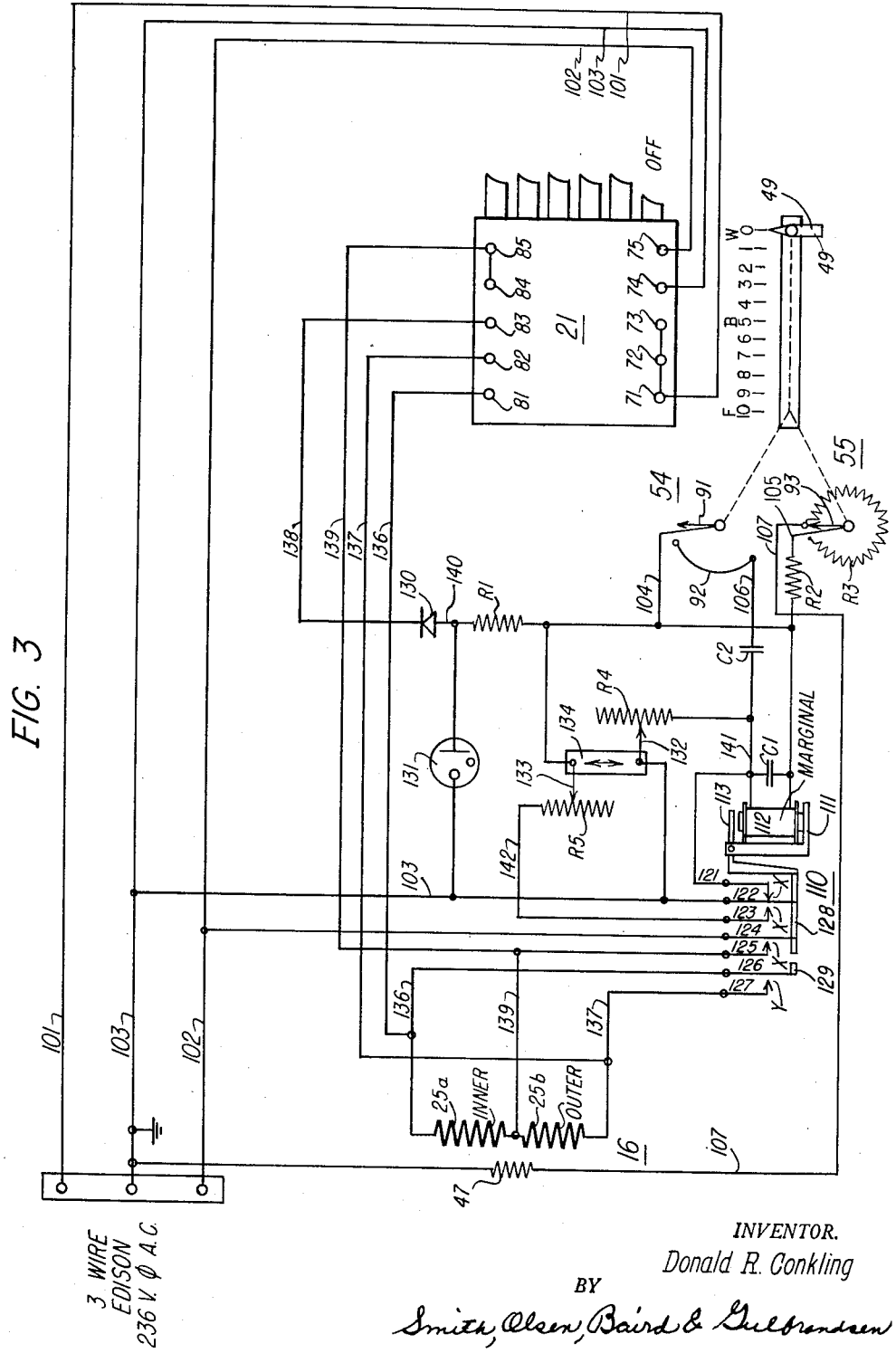
Fig. 3 is a diagram of the electric control circuit for the electric heating unit or hotplate and incorporating the temperature sensing unit, both shown in Fig. 2, as well as a manually operable control switch of the pushbutton type, the pushbutton switch being diagrammatically illustrated in its off position.
Figure 4:
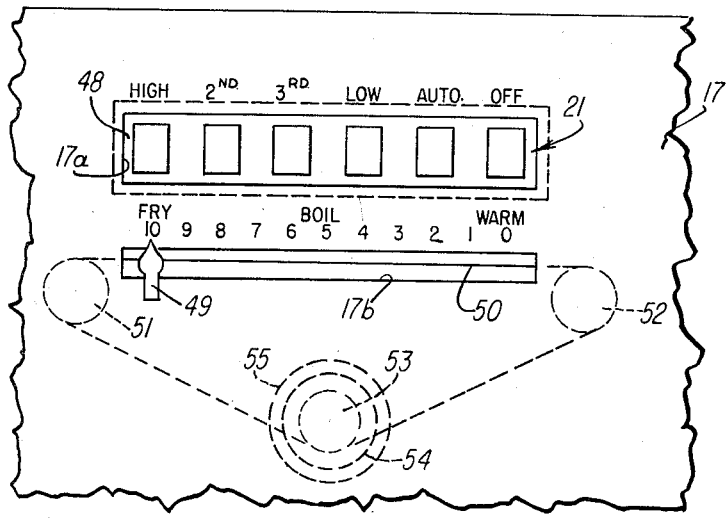

Fig. 4 is an enlarged fragmentary front elevational view of a portion of the backsplash of the electric range shown in Fig. 1, illustrating the arrangement of the manually operable temperature control member operatively associated with the pushbutton switch for the hotplate shown in Fig. 2; and Figs. 5 to 9, inclusive, are diagrammatic illustrations of the pushbutton switch, shown in both Figs. 3 and 4, when it occupies its respective high, second, third, low and automatic positions.

Referring now to Fig. 1 of the drawings, there is illustrated an electric range 10 incorporating electric heating apparatus embodying the features of the present invention and comprising an upstanding body 11 provided with a substantially horizontally disposed cooking top 12 supporting a plurality of surface heating units or hotplates 13, 14, 15 and 16 arranged in spaced-apart relation in a substantially rectangular pattern on the left-hand side thereof. The body 11 houses an oven, not shown, in the right-hand portion thereof, and the compartment, not shown, in the left-hand portion thereof, the oven and compartment being provided with respective front doors, not shown. The cooking top 12 carries an upstanding backsplash 17 adjacent to the rear thereof, that, in turn, carries a plurality of surface heating unit selector switches 18, 19 and 20, a special surface heating unit selector or control switch 21, an oven selector switch 22, and an oven regulator or thermostatic switch 23, the elements 18 to 23, inclusive, being arranged in a row across the top of the backsplash 17. The selector switches 18, 19 and 20 respectively correspond to the surface heating units 13, 14 and 15 of conventional construction and are respectively included in the electric heating circuits thereof; while the special control switch 21 corresponds to the surface heating unit 16 of special construction and is included in the electric heating circuit thereof. Each of the surface heating unit selector switches 18, 19 and 20 is of the pushbutton type and is preferably of the construction of that disclosed in U. S. Patent No. 2,431,904, granted on December 2, 1947, to John L. Andrews; the special control switch 21 is of the pushbutton type and of a modified form with respect to the construction disclosed in the Andrews patent mentioned, as explained more fully hereinafter; and the thermostatic switch 23 is of conventional construction.

The cooking top 12 has a plurality of openings therein that respectively receive the surface heating units 13, etc.; and each of the surface heating units 13, 14 and 15 may be fundamentally of the construction disclosed in U. S. Patent No. 2,565,443, granted on August 21, 1951, to Oliver G. Vogel and Francis E. Kirk; while the surface heating unit 16 is of special construction described more fully below.

The surface heating unit 16 is of the hotplate type and is mounted for pivotal movements in the associated opening provided in the cooking top 12, by mechanism, not shown, that is preferably of the construction of that disclosed in U. S. Patent No. 2,565,432, granted on August 21, 1951, to Francis E. Kirk. More particularly, referring to Fig. 2, the heating unit 16 comprises a spider 24 carrying a heating element 25 including respective inner and outer sections 25a and 25b, only a portion of the inner section 25a being illustrated. The heating element 25 is generally in the form of a helical coil or spiral, the turns of which are arranged in radially spaced-apart relation; and preferably, the heating element 25 is of the metal sheath-helical resistance conductor type disclosed in U. S. Patent No. 1,367,341, granted on February 1, 1921, to Charles C. Abbott. The spider 24 comprises a substantially centrally disposed upstanding ring 26, the coils of the heating element 25 being selectively staked to the arms of the spider 24 in the general manner disclosed in the Vogel and Kirk patent mentioned. The top surfaces of the coils of the heating element 25 are flattened to define a substantially horizontal plane adapted to engage and support the bottom wall of a cooking vessel, or the like, not shown.

The hotplate 16 carries a temperature-sensing unit 27 within the central ring 26 that is adapted to engage the bottom wall of the cooking vessel, or the like, supported upon the heating element 25; and more particularly, a pair of opposed depending arms 28 are arranged exteriorly of the central ring 26 and an upstanding tubular heat shield 29 is arranged interiorly of the central ring 26, the arms 28 and the heat shield 29 being retained in place by an opposed pair of rivets 30. The arms 28 terminate in inwardly directed flanges 31 disposed below the central ring 26 that carry upper nad lower substantially cup-shaped insulating housings 32 and 33 formed of lava, or the like. The upper housing 32 is arranged in inverted position and constitutes a supporting base, the housings 32 and 33 being retained in place upon the flanges 31, with an asbestos ring 34 clamped therebetween, by removable screws 35 provided with cooperating nuts 36. An upstanding tubular member 37 is slidably mounted in a cooperating opening 38 provided in the top of the base 32, the upper end of the tubular member 37 carrying insulating ring 39 formed of lava, or the like, and arranged within the heat baffle 29 in spaced relation with respect thereto. The tubular member 37 is retained in place by an arrangement including a surrounding washer 40 and a cooperating lock ring 41 carried on the lower end thereof and cooperating with the top of the base 32 adjacent to the opening 38. The ring 39, in turn, carries a depending tubular heat shield 42 of general skirt-like structure that is spaced inwardly with respect to the cooperating heat shield 29, the extreme lower end of the heat shield 42 being outwardly flared, as indicated at 43, so that it covers the top of the base 32. A central cavity 44 is formed in top of the ring 39 and carries a sensing button 45 formed of aluminum, or the like.

In the arrangement, the heat shields 29 and 42, as well as the tubular member 37, are preferably formed of stainless steel, or other bright and reflective material; while the sensing button 45 is formed of aluminum, or the like, as previously noted, so that it constitutes a good heat conductor capable of following closely the temperature of the bottom wall of a cooking vessel, or the like, supported by the heating element 25. The tubular member 37, the ring 39, the heat shield 42 and the sensing button 45 are movable as a unit with respect to the base 32 by virtue of the arrangement of a coil spring 46 surrounding the tubular member 37 and disposed between the top of the base 32 and the bottom of the ring 39. More particularly, the coil spring 46 normally biases the parts 37, 39, 42 and 45 upwardly with respect to the base 32; whereby the top surface of the sensing button 45 is normally disposed slightly above the substantially horizontal plane of the flattened top surface of the heating element 25. However, when a cooking vessel, or the like, is placed upon the heating element 25, the bottom wall thereof engages the top surface of the sensing button 45 moving the elements 37, 39, 42 and 45 downwardly with respect to the base 32 against the bias of the current spring 46; whereby the top surface of the sensing button 45 is urged in good thermal contact with the bottom wall of the supported cooking vessel by the coil spring 46.

A temperature sensing resistor 47 is arranged in a cooperating centrally disposed cavity formed in the lower surface of the sensing button 45, the temperature sensing resistor 47 is, of course, movable with the sensing button 45 and is arranged in good heat exchange relation therewith, for a purpose more fully explained hereinafter, the temperature sensing resistor 47 being included in an external electric circuit, described more fully hereinafter, the connecting wiring elements extending through the tubular member 37 and through a hole 33a provided in the housing 33. Since the wiring mentioned is subject to a rather high temperature, it is preferably formed of silver, or the like, and is preferably covered with an insulating material capable of withstanding the relatively high temperature mentioned, such, for example, as polytetrafluoroethylene, sold as "Teflon." The sensing resistor 47 is formed of material having a high negative temperature coefficient of resistance, such, for example, as the material consisting of sintered aluminum oxide and an oxide of magnesium, manganese, titanium, iron, nickel, cobalt, zinc, etc., and known as "thermistor" material. For example, the thermistor 47 may have the exceedingly high temperature coefficient of resistance corresponding to a resistance rate change of: $-0.044$ ohm/ohm/°C.; whereby the characteristic of the thermistor 47 may be as follows:

| Temperature (°C.): | Total resistance (ohms) |
|---|---|
| 25 | 100,000 |
| 50 | 34,000 |
| 100 | 6,000 |
| 150 | 1,700 |
| 200 | 580 |

As best shown in Figs. 1 and 4, the special control switch 21 is of the pushbutton type, as previously noted, and comprises a casing 48 housed within the hollow backsplash 17 and carrying six individual pushbuttons projecting forwardly through a cooperating elongated slot 17a formed in the front wall of the backsplash 17, the six individual pushbuttons mentioned being respectively designated: "High", "2nd", "3rd", "Low", automatic (abbreviated "Auto.") and "Off", the six individual pushbuttons named being respectively arranged from left-to-right, as illustrated in Fig. 4, and the adjacent front wall of the backsplash 17 carrying the corresponding indicia "High", etc. Also an elongated slot 17b is arranged in the front wall of the backsplash 17 below and adjacent to the slot 17a; and within the slot 17b there is arranged a manual control knob or handle 49 that is secured to an associated flexible endless cable 50 that is carried by three associated pulleys or wheels respectively indicated at 51, 52 and 53, whereby the knob 49 is mounted for linear movement in the slot 17b below the six pushbuttons of the manual control switch 21. The three pulleys 51, 52 and 53 are housed within the hollow backsplash 17 and are mounted for rotation; while the pulley 53 is operatively connected both to switch structure, generally indicated at 54, and to a variable rheostat, generally indicated at 55, the elements 54 and 55 also being housed within the hollow backsplash 17. The manually operable knob 49, as well as the elements 54 and 55, comprise a portion of a temperature-adjusting arrangement, described more fully hereinafter; and the manual knob 49 is movable into warm, boil and fry positions and respectively cooperates with corresponding numerical indicia: "0–10", as well as the indicia: "Warm", "Boil" and "Fry", all carried upon the adjacent front wall of the backsplash 17 between the slots 17a and 17b. In the arrangement, the positions of the manual knob 49 in its range correspond to temperatures of a cooking vessel supported by the hotplate 16; whereby the warm range may correspond to the temperature range 120°–220° F., the boil range may correspond to the temperature range 220°–320° F., and the fry range may correspond to the temperature range 320°–420° F. Accordingly, the warm, boil and fry ranges respectively correspond to meat-cooking, candy-making and deep-fat-frying cooking operations.

Figure 5:
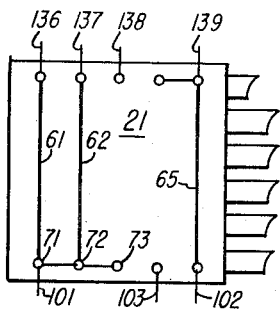
Figure 8:
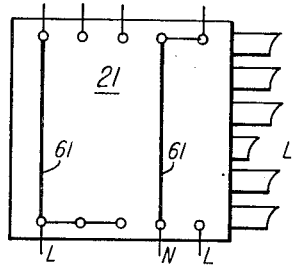
Figure 6:
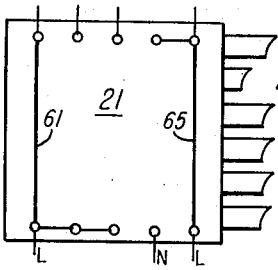
Figure 9:
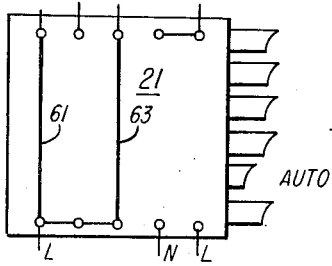
Figure 7:
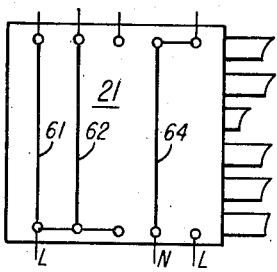

As previously noted, the manually operable pushbutton switch 21 is of the general construction and arrangement of that disclosed in the previously-mentioned Andrews patent, but is modified to include the particular controls governed by the individual six pushbuttons thereof, as respectively shown in Figs. 3 and 5 to 9, inclusive. More particularly, the casing 48 houses five individual switch blades 61 to 65, inclusive, five individual incoming terminals 71 to 75, inclusive, five individual outgoing terminals 81 to 85, inclusive, and mechanism selectively governed by the six individual pushbuttons for selectively operating the five individual switch blades 61 to 65, inclusive. More specifically, when the off pushbutton occupies its operated position, as shown in Fig. 3, the five incoming terminals 71 to 75, inclusive, are respectively disconnected with respect to the five outgoing terminals 81 to 85, inclusive; when the high pushbutton occupies its operated position, as shown in Fig. 5, the three individual incoming terminals 71, 72 and 75 are respectively connected by the three individual switch blades 61, 62 and 65 to the three individual outgoing terminals 81, 82 and 85; when the 2nd pushbutton occupies its operated position, as shown in Fig. 6, the two individual incoming terminals 71 and 75 are respectively connected by the two individual switch blades 61 and 65 to the two individual outgoing terminals 81 and 85; when the 3rd pushbutton occupies its operated position, as shown in Fig. 7, the three individual incoming terminals 71, 72 and 74 are respectively connected by the three individual switch blades 61, 62 and 64 to the three individual outgoing terminals 81, 82 and 84; when the low pushbutton occupies its operated position, as shown in Fig. 8, the two individual incoming terminals 71 and 74 are respectively connected by the two individual switch blades 61 and 64 to the two individual outgoing terminals 81 and 84; and when the automatic pushbutton occupies its operated position, as shown in Fig. 9, the two individual incoming terminals 71 and 73 are respectively connected by the two individual switch blades 61 and 63 to the two individual outgoing terminals 81 and 83. Also, within the casing 48, the three individual incoming terminals 71, 72 and 73 are permanently strapped, and the two individual outgoing terminals 84 and 85 are permanently strapped. Further, the pushbutton switch 21 comprises interlock mechanism, not shown, of the character of that disclosed in the previously-mentioned Andrews patent so that the operation of any one of the pushbuttons into its depressed position effects the return of the last-operated one of the pushbuttons into its projected position; whereby only one of the six individual pushbuttons may occupy its depressed or operated position at any time.

As best shown in Figs. 3 and 4, the switch structure 54 includes a wiper 91 operatively associated with a conducting segment 92; and the rheostat 55 includes a wiper 93 operatively associated with a main control resistor R3; the wipers 91 and 93 being operatively associated with the manual control knob 49, via the pulley 53 and the endless cable 50, as previously explained.

The circuit network comprises, as shown in Fig. 3, certain elements that are connected and arranged in the general manner of those disclosed in the copending application of Robert J. Molyneaux, Serial No. 445,859, filed July 26, 1954, and including a three-wire Edison source of power supply of 230 volts, single-phase, A. C., provided with two outside lines 101 and 102 and a grounded neutral line 103, the outside lines 101 and 102 being respectively connected to the incoming terminals 71 and 75 of the pushbutton switch 21, and the neutral line 103 being connected to the incoming terminal 74 thereof. The wipers 91 and 93 terminate two conductors 104 and 105; the conducting segment 92 terminates a conductor 106; one terminal of the main control resistor R3 terminates a conductor 107; and the other terminal of the resistor R3 is open. In the arrangement, when the manual control knob 49 occupies its warm position, the wiper 91 disengages the cooperating conducting segment 92, and the wiper 93 engages the end of the cooperating resistor R3 terminating the conductor 107. As the manual knob 49 is moved linearly from its right-hand warm range toward the left and into its boil range, the wiper 91 remains in disengagement with the conducting segment 67, and the wiper 93 progressively inserts the main control resistor R3 between the conductors 105 and 107. As the manual knob 49 is moved further toward the left into its fry range, the wiper 91 engages the conducting segment 92, and the wiper 93 inserts an additional portion of the main control resistor R3 between the conductors 105 and 107.

Also, the circuit network comprises an electromagnetic relay 110 of the marginal type provided with a field structure 111 carrying an operating winding 112 and provided with a pivotally mounted armature 113 that cooperates with a number of switch springs 121 to 127, inclusive. In the arrangement, the switch spring 122 commonly cooperates with the rear switch spring 121 and the front switch spring 123, while the movable switch springs 124 and 126 respectively cooperate with the front switch springs 125 and 127. Moreover, the movable switch springs 122 and 124 are operated by the armature 113 on an "X" basis, while the movable switch spring 126 is operated by the armature 113 on a "Y" basis. In other words, when the armature 113 is operated, the movable switch springs 122 and 124 complete their operating movements prior to the operating movement of the movable switch spring 126; whereas, when the armature 113 is restored, the movable switch spring 126 completes its restoring movement prior to the restoring movements of the movable switch springs 122 and 124; which arrangement is achieved by the construction of the associated insulating operators 128 and 129 operatively associated with the armature 113.

Further, the circuit network comprises a dry plate rectifier 130, preferably of the selenium type, an associated load resistor R1, a current limiting resistor R2, two auxiliary control resistors R4 and R5, a gaseous discharge tube 131 of the glow discharge type, and two capacitors C1 and C2. In the arrangement, the auxiliary control resistors R4 and R5 are respectively provided with associated wipers 132 and 133 that are commonly mounted upon an associated insulating slide 134, so that when the slide 134 is moved in one direction an increased portion of the resistor R4 is tapped by the associated wiper 132 and a decreased portion of the resistor R5 is tapped by the associated wiper 133, and so that when the slide 134 is moved in the opposite direction a decreased portion of the resistor R4 is tapped by the assoicated wiper 132 and an increased portion of the resistor R5 is tapped by the associated wiper 133. In other words, the wiper 132 and 133 are simultaneously adjusted by the movements of the slide 134 to effect opposite controls with respect to the individually associated resistors R4 and R5.

In the circuit network, the outgoing terminals 81, 82, 83 and 85 of the pushbutton switch 21 respectively terminate four conductors 136, 137, 138 and 139; the rectifier 100 is connected between the conductor 138 and a conductor 140, and the load resistor R1 is connected between the conductor 140 and the conductor 104, whereby the conductor 140 constitutes a supply conductor and the conductor 104 constitutes a feed conductor. The glow discharge tube 131 is directly connected between the supply conductor 140 and the neutral line 103 and constitutes a voltage regulating device, as explained more fully hereinafter. The current limiting resistor R2 is connected between the feed conductor 104 and the conductor 105; the neutral line 103 is also connected to the wiper 132; and the feed conductor 104 is also connected to the wiper 133. Further, the feed conductor 104 is connected to one terminal of the winding 112 of the relay 110, the other terminal of the winding 112 being connected to a conductor 141. One terminal of the auxiliary control resistor R4 is connected to the conductor 141 and the other terminal thereof is open; while one terminal of the auxiliary control resistor R5 is connected to a conductor 142 and the other terminal thereof is open. The capacitor C1 is bridged across the feed conductor 104 and the conductor 141; while the capacitor C2 is bridged across the conductors 141 and 106.

The inner and outer sections 25a and 25b of the heating element 25 are connected in series relation, as previously noted, one terminal of the inner section 25a being connected to the conductor 136, one terminal of the outer section 25b being connected to the conductor 137, and the common terminal between the sections 25a and 25b being connected to the conductor 139. The switch spring 122 terminates the neutral line 103; the switch spring 124 terminates the outside line 102; and the switch springs 121, 123, 125, 126 and 127 respectively terminate the conductors 141, 142, 139, 136 and 137. Finally, the sensing resistor or thermistor 47 is connected between the conductor 107 and the neutral line 103, whereby the neutral line 103 also constitutes a feed conductor.

In the circuit network, the characteristic values of certain of the elements may be as follows:

| | | |
|---|---|---|
| R1 | ohms | 1,800 |
| R2 | do | 40,000 |
| R3 | do | 0–5,000 |
| R4 | do | 0–10,000 |
| R5 | do | 0–4,800 |
| C1 | microfarads | 25 |
| C2 | do | 20 |

The pickup current of the winding 112 of the marginal relay 110 may be about 10 milliamperes D. C., and the dropout current of the winding 112 may be about 6 milliamperes D. C.; and the selenium rectifier 131 may be rated at 117 volts A. C., 60 cycles, 30 milliamperes D. C.

Considering now the operation of the circuit network, when the pushbutton switch 21 occupies its normal off position, as illustrated in Fig. 3, the lines 101, 102 and 103 are disconnected from all of the conductors 136, 137, 138 and 139, deenergizing all of the elements of the circuit network, so that the relay 110 normally occupies its restored position bringing about the deenergization of the inner and outer sections 25a and 25b of the heating element 25; and of course the glow discharge tube 131 is extinguished since no current is conducted through the rectifier 130 and no voltage appears upon the supply conductor 104.

Now assuming that the cook wishes to carry out a cooking operation at high heat independently of temperature control by the thermistor 47, she merely operates the high pushbutton of the pushbutton switch 21 into its position as shown in Fig. 5; whereby the outside line 101 is respectively connected by the switch blades 61 and 62 to the conductors 136 and 137 and the outside line 102 is connected by the switch blade 65 to the conductor 139. Accordingly, the inner and outer sections 25a and 25b of the heating unit 25 are connected in parallel relationship across the outside lines 101 and 102 of the three-wire Edison source; whereby the hotplate 16 is heated at the high rate entirely independently of the temperature control arrangement.

Now assuming that the cook wishes to carry out a cooking operation at 2nd heat independently of temperature control by the thermistor 47, she merely operates the 2nd pushbutton of the pushbutton switch 21 into its position as shown in Fig. 6; whereby the outside lines 101 and 102 are respectively connected by the switch blades 61 and 65 to the conductors 136 and 139. Accordingly, the inner section 25a of the heating unit 25 is connected across the outside lines 101 and 102 of the three-wire Edison source; whereby the hotplate 16 is heated at the 2nd rate entirely independently of the temperature control arrangement.

Now assuming that the cook wishes to carry out a cooking operation at 3rd heat independently of temperature control by the thermistor 47, she merely operates the 3rd pushbutton of the pushbutton switch 21 into its position as shown in Fig. 7; whereby the outside line 101 is respectively connected by the switch blades 61 and 62 to the conductors 136 and 137 and the neutral line 103 is connected by the switch blade 64 to the conductor 139. Accordingly, the inner and outer sections 25a and 25b of the heating unit 25 are connected in parallel relationship across the outside line 101 and the neutral line 103 of the three-wire Edison source; whereby the hotplate 16 is heated at the 3rd rate entirely independently of the temperature control arrangement.

Now assuming that the cook wishes to carry out a cooking operation at low heat independently of temperature control by the thermistor 47, she merely operates the low pushbutton of the pushbutton switch 21 into its position as shown in Fig. 8; whereby the outside line 101 and the neutral line 103 are respectively connected by the switch blades 61 and 64 to the conductors 136 and 139. Accordingly, the inner section 25a of the heating unit 25 is connected across the outside line 101 and the neutral line 103 of the three-wire Edison source; whereby the hotplate 16 is heated at the low rate entirely independently of the temperature control arrangement.

Now assuming that the cook wishes to carry out an automatic temperature controlled cooking operation, she first sets the manual knob 49 into the desired heat range and then operates the automatic pushbutton of the pushbutton switch 21 into its position as shown in Fig. 9; whereby the outside line 101 is respectively connected by the switch blades 61 and 63 to the conductors 136 and 138. At this time, it may be assumed that the manual knob 49 is set into its warm range, that the heating element 25 of the hotplate 16 is cool, and that the cook places the cooking vessel and its contents in its supported position upon the top surface of the heating element 25, so that the bottom wall of the cooking vessel engages the sensing button 45 and moves the sensing unit 27 into its depressed position in order that the sensing button 45 is in good thermal contact with the bottom of the cooking vessel. A this time, the thermistor 47 is cool so that it has the extremely high resistance previously noted; and when the outside line 101 is connected to the conductor 138 by operation of the automatic pushbutton of the pushbutton 21, there is completed a circuit for operating the rectifier 130 and for effecting operation of the glow discharge tube 131. This circuit extends from the conductor 138 via the rectifier 130 to the supply conductor 140, and from the supply conductor 140 via the glow discharge tube 131 to the neutral line 103; whereby the glow discharge tube 101 operates to regulate the half-wave rectified voltage appearing upon the supply conductor 140. At this time, a path may be traced from the supply conductor 140 via the load resistor R1 to the feed conductor 104; a first circuit for energizing the winding 112 of the relay 110 may be traced from the feed conductor 104 via the conductor 141 and the contacts between the switch springs 121 and 122 to the neutral line 103; and a series bridge circuit may be traced from the feed conductor 104 via the current limiting resistor R2, the conductor 105, the wiper 93, a portion of the main control resistor R3, the conductor 107 and the thermistor 47 to the neutral line 103. Accordingly, at this time, the winding 112 of the relay 110 is energized causing the relay to operate so that its armature 113 is actuated. More particularly, the movable switch spring 122 disengages the stationary switch spring 121 opening a normally closed short-circuit between the neutral line 103 and the conductor 141 around the auxiliary control resistor R4; whereby the resistor R4 is inserted in series relation with the winding 112 between the feed conductor 104 and the neutral line 103, for a purpose more fully explained hereinafter. Also, the movable switch spring 122 engages the stationary switch spring 123 completing a circuit for connecting the auxiliary control resistor R5 between the feed conductor 104 and the neutral line 103. Further, the movable switch spring 124 engages the stationary switch spring 125 completing a circuit for energizing the inner section 25a of the heating element 25 across the outside lines 101 and 102; and then the movable switch spring 126 engages the stationary switch spring 127 to complete a circuit for energizing the outer section 25b of the heating element 25 across the outside lines 101 and 102. Thus at this time, the inner and outer sections 25a and 25b of the heating element 25 are energized in parallel relation across the outside lines 101 and 102 of the three-wire Edison source effecting heating of the heating element 25 at the high rate and the consequent heating of the supported cooking vessel and the resulting heating of the thermistor 47 arranged in good heat exchange relation with the bottom wall of the supported cooking vessel.

At this time, when the thermistor 47 is cool, the above-traced series bridge circuit, including the current limiting resistor R2, the main control resistor R3 and the thermistor 47, has an exceedingly high composite resistance due to the exceedingly high resistance of the thermistor 47, as previously explained, whereby an exceedingly small current traverses this series bridge circuit, resulting in the passage of an exceedingly small load current through the load resistor R1, as a result of the current traversing the series bridge circuit, whereby the voltage upon the feed conductor 104 is quite high. In passing, it is noted that the capacitor C1 bridged across the winding 112 of the relay 110 also serves as a filter capacitor minimizing the A. C. ripple upon the D. C. voltage appearing between the feed conductor 104 and the grounded neutral line 103.

Initially, the winding 112 of the relay 110 is energized directly between the feed conductor 104 and the neutral line 103, thereby insuring a quick pickup or operation thereof; however, incident to operation of the relay 110, the auxiliary control resistor R4 was inserted in series relation with the energizing circuit for the operating winding 112 so as to facilitate subsequently the restoration of the relay 110 in the event of a reduction in the voltage applied to the feed conductor 104. Moreover, incident to operation of the relay 110, the auxiliary control resistor R5 was bridged between the feed conductor 104 and the neutral line 103 in order to compensate the network for the effective change in the resistance of the circuit for energizing the winding 112 of the relay 110 as a consequence of the operation of the relay 110 from its restored position into its operated position. This compensation of the circuit network insures that the change of position of the relay 110 from its restored position into its operated position imposes no different ultimate load upon the feed conductor 104 and consequently upon the load resistor R1, whereby the load current traversing the load resistor R1 is substantially the same when the relay 110 occupies either its restored position or its operated position. In order to insure this result, the equivalent resistance between the feed conductor 104 and the neutral line 103 should be the same when the relay 110 occupies its respective restored and operated positions; whereby:

$$R \text{ (equiv.)} = R_{112} = \frac{(R_{112} + R_4) R_5}{R_{112} + R_4 + R_5}$$

wherein:

$R_{112}$ = resistance of the winding 112
$R_4$ = resistance of the resistor R4
$R_5$ = resistance of the resistor R5

As the temperature of the heating element 25 rises, with the passage of time, the temperature of the cooking vessel and its contents rise; whereby the sensing button 45 is heated through the bottom wall of the cooking vessel to raise the temperature thereof so as to bring about an increase in the temperature of the thermistor 47; whereby the resistance of the thermistor 47 is decreased effecting a corresponding decrease in the compositive resistance of the series bridge circuit, also including the limiting resistor R2 and the main control resistor R3. As the composite resistance of this series bridge circuit is thus decreased, the current traversing the same is correspondingly increased, so that the current traversing the load resistor R1 is correspondingly increased, bringing about an increase in the voltage drop across the load resistor R1 and a consequent decrease in the voltage appearing between the feed conductor 104 and the neutral line 103. As the voltage thus applied to the feed conductor 104 is reduced, the current traversing the operating winding 112 and the auxiliary control resistor R4 in series relation is proportionately decreased, whereby the reduction in the current traversing the operating winding 112 of the relay 110 tends to bring about restoration of the relay 110. As the temperature of the cooking vessel is further increased, the above-described actions are accentuated, whereby ultimately the resistance of the thermistor 47 is reduced sufficiently that the current traversing the series bridge circuit is adequate to produce a voltage reduction upon the feed conductor 104, so that the current traversing the winding 112 is insufficient to retain the relay 110 in its operated position, so that the relay 110 restores.

More particularly, the armature 113 of the relay 110 is returned from its operated position back into its restored position so that the movable switch spring 126 first disengages the stationary switch spring 127 interrupting the circuit for energizing the outer section 25b of the heating element 25; thereafter, the movable switch springs 122 and 124 respectively disengage the stationary switch springs 123 and 125 and the movable switch spring 122 re-engages the stationary switch spring 121. The disengagement of the switch springs 124 and 125 interrupts the circuit for energizing the inner section 25a of the heating element 25; the disengagement of the switch springs 122 and 123 interrupts the path for connecting the auxiliary control resistor R5 between the feed conductor 104 and the neutral line 103; and the re-engagement of the switch springs 122 and 121 again short-circuits the auxiliary control resistor R4, recompleting the original direct circuit for energizing the winding 112 between the feed conductor 104 and the neutral line 103. At this time, it may be assumed that the voltage applied to the feed conductor 104 as a consequence of the load imposed upon the load resistor R1 by the series bridge circuit is inadequate to reoperate the relay 110, although the removal of the auxiliary control resistor R4 from the circuit for energizing the winding 112 facilitates further operation of the relay 110 from its restored position back into its operated position. Again, it is noted that the interruption of this circuit for connecting the auxiliary control resistor R5 across the feed conductor 104 and the neutral line 103, together with the interruption of the series circuit for energizing the winding 112 through the auxiliary control resistor R4, along with the recompletion of the direct circuit for energizing the winding 112 between the feed conductor 104 and the neutral line 103, does not change the effective resistance of the network due to the substantially constant equivalent resistance thereof, as explained above, when the relay 110 occupies either its operated position or its restored position; whereby the change of position of the relay 110 does not, in any way, affect the control of the series bridge circuit, including the thermistor 47, that is governed by the temperature of the bottom wall of the cooking vessel supported by the heating element 25.

Subsequently, the temperature of the heating element 25 subsides effecting a reduction in the temperature of the cooking vessel and its contents so that the temperature of the thermistor 47 is reduced bringing about an increase in the resistance thereof with a consequent decrease in the current traversing the series bridge circuit, whereby the voltage applied to the feed conductor 104 rises as a consequence of the reduction in the voltage drop across the load resistor R1, so that an increased voltage is applied across the operating winding 112 of the relay 110. As the temperature of the cooking vessel is further reduced, the above-described actions are accentuated, whereby the voltage ultimately appearing upon the feed conductor 104 is sufficient to effect reoperation of the relay 110 from its restored position back into its operated position.

In view of the foregoing description, it will be understood that the relay 110 is alternately operated and restored to effect connection and disconnection of the heating element 25 with respect to the outside lines 101 and 102 of the Edison source so as to maintain the previously-set temperature of the cooking vessel that is supported by the heating element 25. In this connection, it will be understood that the composite resistance of the series bridge circuit is controlled jointly by the resistance of the thermistor 47 and by the resistance of the main control resistor R3, whereby the setting of the manual knob 49 in the warm range selectively controls the effective resistance of the main control resistor R3, and accordingly, selectively sets the temperature that is to be maintained by the circuit network. More specifically, linear movement of the manual control knob 49 toward the left in its warm range selectively operates the rheostat 55 progressively to include additional resistance of the main control resistor R3 in the series bridge circuit, whereby the thermistor 47 must be heated to a progressively higher temperature to effect a correspondingly lower resistance thereof and a consequent equivalent resistance of the series bridge circuit. Thus setting of the manual knob 49 toward the left is effective to increase the effective resistance of the main control resistor R3 and consequently the effective resistance of the series bridge circuit, and results in a higher temperature being maintained by the control network as governed by the thermistor 47 under the control of the temperature of the cooking vessel supported by the hotplate 16.

In conjunction with the operation and restoration of the relay 110, the action of the capacitor C1 is particularly noted. When the relay 110 occupies its restored position, the full voltage of the feed conductor 104 is applied in parallel relation to the winding 112 and to the capacitor C1; whereas, when the relay 110 occupies its operated position, the auxiliary control resistor R4 is inserted in series relation with the winding 112 and consequently with the capacitor C1. Thus the voltage applied across the capacitor C1 is higher prior to operation of the relay 110 than it is subsequent to operation of the relay 110; whereby the capacitor C1 is at least partially discharged through the winding 112 incident to operation of the relay 110. This action insures that the relay 110 remains in its operated position at least during this discharge time interval of the capacitor C1. Conversely, when the relay 110 is actuated from its operated position into its restored position, the capacitor C1 is charged to a higher voltage as a result of the removal of the auxiliary control resistor R4 from the charging circuit thereof. This action insures a load upon the load resistor R1 at least during this charging time interval of the capacitor C1 so as to insure that the relay 110 remains in its restored position during this time interval. Accordingly, the arrangement of the capacitor C1 in the circuit network, as described above, prevents rapid hunting or fluttering of the relay 110 between its operated and restored positions.

Also, in conjunction with the operation and restoration of the relay 110, it will be understood that the inner and outer sections 25a and 25b of the heating element 25 are selectively connected and disconnected with respect to the outside lines 101 and 102 of the Edison source, thereby minimizing arcing of the corresponding contacts between the switch springs 124—125 and 126—127.

In view of the above, it will be understood that the carrying-out of automatic temperature controlled cooking operations in the boil and fry ranges upon the electric range 10 are substantially identical to that described in conjunction with the automatic temperature controlled cooking operation in the warm range, except that the manual knob 49 is moved linearly further toward the left into the corresponding boil and fry ranges thereof, whereby corresponding progressively higher temperatures are set for the action of the control network. In connection with the operation of the manual knob 49 into its fry range, it is noted that the switching apparatus 54 is controlled so that the wiper 91 engages the associated conducting segment 92 so as to bridge the capacitor C2 in parallel with the capacitor C1 across the winding 112 in the relay 110 and between the feed conductor 104 and the conductor 141. This bridging of the capacitor C2 in parallel with the capacitor C1 brings about an increase in the effective capacitance of the circuit network, thereby increasing the timing constant thereof in order that the relay 110 has a tendency to remain both in its operated position and in its restored position shorter time intervals between changes in the position thereof so as to narrow the band of the overshoot and of the undershoot of the temperature of the hotplate 16.

Of course, it will be understood that at the conclusion of any cooking operation, when the off pushbutton of the pushbutton switch 21 is operated into its position, as shown in Fig. 3, all of the connections between the lines 101, 102 and 103 and the conductors 136, 137, 138 and 139 are interrupted effecting deenergization of all of the circuit elements and insuring that the relay 110 occupies its restored position and insuring deenergization of the heating element 25 with respect to the three-wire Edison source.

In the operation of the circuit network, it will be appreciated that the glow discharge tube 131 serves a voltage regulator to maintain substantially constant the rectified voltage applied between the supply conductor 140 and the neutral line 103, notwithstanding some variations in the voltage of the three-wire Edison source.

Further, it is noted that the adjustment of the slide 134, and the consequent adjustments of the auxiliary control resistors R4 and R5, normally comprises a factory or repairman's adjustment and insures that the operating range of the circuit network corresponds to and is calibrated within the range of the manual control knob 49. In this connection, it will be observed that the auxiliary control resistors R4 and R5 are adjusted in opposite directions by any movement of the slide 134, as it will be appreciated from the foregoing formula that when the resistance of the resistor R4 is increased, the resistance of the resistor R5 should be decreased, so that the equivalent resistance of the circuit network is maintained substantially constant regardless of the operated position or the restored position of the relay 110, for the purpose previously explained.

The purpose of the current limiting resistor R2 is to prevent self-heating of the thermistor 47 by the current passing therethrough in the series bridge circuit when the main control resistor R3 is substantially cut-out of the series bridge circuit. In other words, when the main control resistor R3 is set at a minimum resistance corresponding to the lowermost subsection of the warm range of the manual control knob 49, it is undesirable that the thermistor 47 should be heated as a consequence of the current passing therethrough; which undesirable possibility is prevented by the fixed inclusion of the current-limiting resistor R2 in the series bridge circuit.

In view of the foregoing description of the mode of operation of the circuit network, it will be understood that high, 2nd, 3rd and low cooking operations may be carried out upon the hotplate 16 entirely independently of the temperature control arrangement, when the pushbutton switch 21 occupies its corresponding high, 2nd, 3rd and low positions, that automatic temperature controlled cooking operations may be carried out upon the hotplate 16 when the pushbutton switch 21 occupies its corresponding automatic position, and that the hotplate 16 is completely deenergized when the pushbutton switch 21 occupies its corresponding off position. In the automatic temperature controlled cooking operations, the thermal controls that are derived by the thermistor 47 from the cooking vessel supported by the hotplate 16 are translated thereby into electrical controls in the series bridge circuit in order selectively to establish the voltage applied to the feed conductor 104 and consequently the position of the relay 110 so that the heating element 25 is selectively connected and disconnected with respect to the three-wire Edison source for the purpose of maintaining the preset temperature. In the arrangement, the range of the thermistor 47 may be selectively established by selectively setting the effective resistance of the main control resistor R3, which may be accomplished by corresponding manipulation of the manual control knob 49. Accordingly, the heating element 25 is energized cyclically effecting modulation of the heating of the hotplate 16 and thereby maintaining the preset cooking temperature of the supported cooking vessel and its contents.

Accordingly, it is apparent that there has been provided in heating apparatus of the hotplate type, an improved circuit network for selectively establishing the heating rate of the hotplate independently of the cooking temperature thereof, and also for selectively establishing within a relatively wide temperature range the cooking temperature of a cooking vessel supported by the hotplate and for selectively controlling the electric power supplied to the hotplate in accordance with the desired cooking temperature thus established, so as to maintain the desired cooking temperature of the cooking vessel and its contents during the cooking operation; wherein the controls mentioned are established fundamentally by the selective operation of a single manually operable pushbutton switch in conjunction with a single and separate manually operable temperature control knob.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In electric heating apparatus including an electric heating unit adapted to support a vessel to be heated, a source of electric power, and a power switch operative between an open position disconnecting said heating unit from said source and a closed position connecting said heating unit to said source; the combination comprising a unitary manually operable control switch having an automatic temperature control position and a plurality of heat-setting positions and an off position, automatic temperature control equipment, said control switch being operative into its automatic temperature control position to prepare said automatic temperature control equipment and selectively operative into its plurality of different heat-setting positions to establish a corresponding plurality of different direct electrical heating connections independent of said power switch between said heating unit and said source so as to effect heating of said heating unit at a corresponding plurality of different heating rates and operative into its off position to disable said automatic temperature control equipment and to disconnect said heating unit from said source, said automatic temperature control equipment including a temperature sensing element operatively associated with a vessel supported by said heating unit and means governed when said equipment is prepared and selectively controlled by said temperature sensing element for selectively operating said power switch between its open and closed positions in order selectively to control the heating of said heating unit, said automatic temperature control equipment also including a device selectively settable correspondingly to set the temperature control range of said temperature sensing element, and means including a manually operable member operatively associated with said control switch for selectively setting said device, said manually operable member being in the form of a knob mounted for selective linear movements to impart said selective settings to said device.

2. In electric heating apparatus including an electric heating unit adapted to support a vessel to be heated, a source of electric power, and a power switch operative between an open position disconnecting said heating unit from said source and a closed position connecting said heating unit to said source; the combination comprising a unitary manually operable control switch having an automatic temperature control position and a plurality of heat-setting positions and an off position, automatic temperature control equipment, said control switch being operative into its automatic temperature-control position to prepare said automatic temperature control equipment and selectively operative into its plurality of different heat-setting positions to establish a corresponding plurality of different direct electrical heating connections independent of said power switch between said heating unit and said source so as to effect heating of said heating unit at a corresponding plurality of different heating rates and operative into its off position to disable said automatic temperature control equipment and to disconnect said heating unit from said source, said automatic temperature control equipment including a temperature sensing element operatively associated with a vessel supported by said heating unit and means governed when said equipment is prepared and selectively controlled by said temperature sensing element for selectively operating said power switch between its open and closed positions in order selectively to control the heating of said heating unit, said automatic temperature control equipment also including a device selectively settable correspondingly to set the temperature control range of said temperature sensing element, said device being provided with an operating shaft mounted for selective rotation to impart selective settings thereto, a manually operable member operatively associated with said control switch and mounted for selective linear movements, and a drive for translating linear movements of said member into rotation of said operating shaft.

3. In an electric range including a cooking top provided with a backsplash, an electric heating unit carried by said cooking top and adapted to support a vessel to be heated, a source of electric power, and a power switch operative between an open position disconnecting said heating unit from said source and a closed position connecting said heating unit to said source; the combination comprising a unitary manually operable control switch carried by said backsplash and having an automatic position and a plurality of heat-setting positions and an off position, automatic temperature control equipment, said control switch being operative into its automatic temperature control position to prepare said automatic temperature control equipment and selectively operative into its plurality of different heat-setting positions to establish a corresponding plurality of different direct electrical heating connections independent of said power switch between said heating unit and said source so as to effect heating of said heating unit at a corresponding plurality of different heating rates and operative into its off position to disable said automatic temperature control equipment and to disconnect said heating unit from said source, said automatic temperature control equipment including a temperature sensing element operatively associated with a vessel supported by said heating unit and means governed when said equipment is prepared and selectively controlled by said temperature sensing element for selectively operating said power switch between its open and closed positions in order selectively to control the heating of said heating unit, said automatic temperature control equipment also including a device selectively settable correspondingly to set the temperature control range of said temperature sensing element, and means including a manually operable member carried by said backsplash adjacent to said control switch for selectively setting said device, said manually operable member being in the form of a knob mounted for selective linear movements to impart said selective settings to said device.

4. In electric heating apparatus including an electric hotplate adapted to support a vessel to be heated, a source of electric power, and equipment for automatically controlling the temperature of said hotplate; the combination comprising a unitary manually operable control switch having an automatic temperature control position and a plurality of heat-setting positions and an off position, said control switch being operative into its automatic temperature control position to establish a first electrical heating connection via said automatic temperature control equipment between said power source and said hotplate and selectively operative into its plurality of different heat-setting positions to establish a corresponding plurality of different direct second electrical heating connections independent of said automatic temperature control equipment between said hotplate and said power source so as to effect heating of said hotplate at a corresponding plurality of different heating rates and operative into its off position positively to disconnect said heating unit from said source, said automatic temperature control equipment being operative selectively to open and to close said established first electrical heating connection so as to govern the temperature of said hotplate, and means including a manually operable member operatively associated with said control switch for selectively setting the temperature control range of said automatic temperature control equipment, said manually operable member being in the form of a knob mounted for selective linear movements to impart said selective settings to said automatic temperature control equipment.

5. In electric heating apparatus including an electric hotplate adapted to support a vessel to be heated, a source of electric power, and a power switch operative between an open position disconnecting said hotplate from said source and a closed position connecting said hotplate to said source: the combination comprising a unitary manually operable control switch having a plurality of heat-setting positions and an off position and an automatic temperature control position, said control switch being selectively operative into its plurality of different heat-setting positions to complete a corresponding plurality of different direct electrical heating connections independently of said power switch between said hotplate and said source so as to effect heating of said hotplate at a corresponding plurality of different heating rates, said control switch being operative into its off position to interrupt each of said heating connections and positively to insure operation of said power switch into its open position; and automatic temperature control equipment comprising a control circuit, means responsive to operation of said control switch into its automatic temperature control position for preparing said control circuit, means including a temperature sensing element operatively associated with a vessel supported by said hotplate for selectively governing said prepared control circuit, means controlled by said selective governing of said control circuit for cyclically operating said power switch between its open and closed positions so as selectively to control heating of said hotplate and consequently to control the temperature of the supported vessel, a selectively settable control device for selectively setting the range of response of said control circuit so as correspondingly to set the cycle of said power switch and consequently to set the desired temperature of the supported vessel, and means including a manually operable member operatively associated with said control switch for selectively setting said control device.

6. The electric heating apparatus combination set forth in claim 5, wherein said control switch is in the form of a pushbutton switch including a number of individual pushbuttons respectively corresponding to its positions and interlock means responsive to operation of any one of said pushbuttons out of its normal position for returning into its normal position the prior last-operated one of said pushbuttons.

References Cited in the file of this patent

UNITED STATES PATENTS

| | | |
|---|---|---|
| 2,556,450 | Schulze | June 12, 1951 |
| 2,613,289 | Warner | Oct. 7, 1952 |
| 2,634,340 | Batcheller | Apr. 7, 1953 |
| 2,654,824 | Schroeder | Oct. 6, 1953 |
| 2,686,250 | Schroeder | Aug. 10, 1954 |
| 2,742,557 | Macoicz | Apr. 17, 1956 |
| 2,742,558 | Simmons | Apr. 17, 1956 |